[11] 3,610,932

[72] Inventors Edward P. Morse
Norwood;
Frederick C. MacNeil, Sudbury, both of Mass.
[21] Appl. No. 853,351
[22] Filed Aug. 27, 1969
[45] Patented Oct. 5, 1971
[73] Assignee Itek Corporation
Lexington, Mass.

[54] FREQUENCY CONVERSION OF NONCOHERENT RADIATION WITH A NONCOHERENT PUMP
10 Claims, 3 Drawing Figs.
[52] U.S. Cl. .................................................. 250/83.3 H, 250/83.3 HP, 250/199
[51] Int. Cl. ................................................... G01j 3/00
[50] Field of Search ........................................ 250/83.3 H, 199, 83.3 HP; 330/4.5, 4.9

[56] References Cited
UNITED STATES PATENTS
3,297,875   1/1967   Garwin et al. ................. 250/199
3,407,309   10/1968  Miller ............................ 330/4.5 X Primary Examiner—Archie R. Borchelt
Attorneys—Homer O. Blair, Robert L. Nathans and William C. Roch ABSTRACT: A noncoherent image in the infrared region is noncollinearly up-converted to the visible portion of the spectrum in a nonlinear crystal utilizing a noncoherent radiation pump. The noncoherent radiation from a target image in the infrared range at a frequency $f_1$ is directed onto a nonlinear crystal such as KDP or Proustite. Radiation at a frequency $f_2$ from a crystal. The two sources of radiation are mixed in the crystal to provide, among other frequencies, the sum frequency $f_1+f_2$ which lies in the visible portion of the spectrum. The output from the crystal is filtered to yield only the sum frequency. The image at the sum frequency is then fed through an image intensifier, after which it may be sensed in either a videoscope, a camera or by eye.

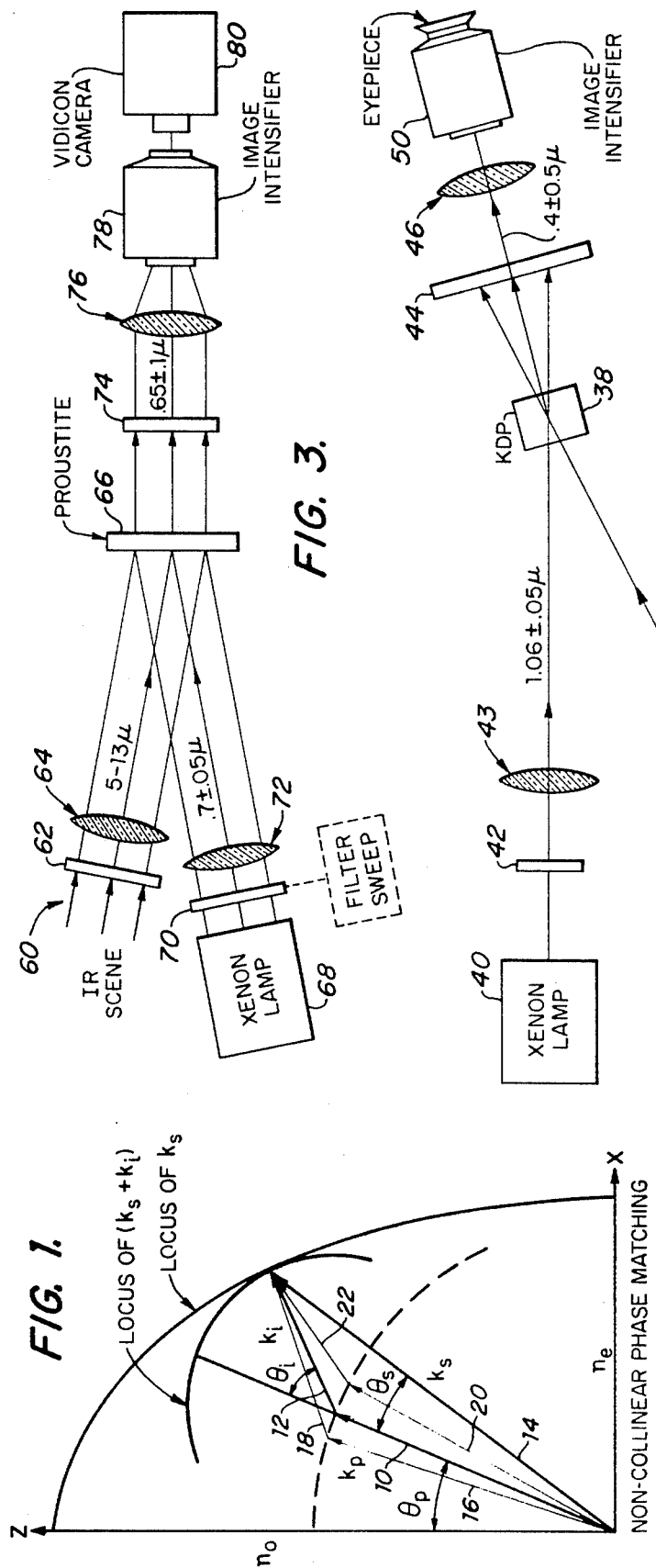
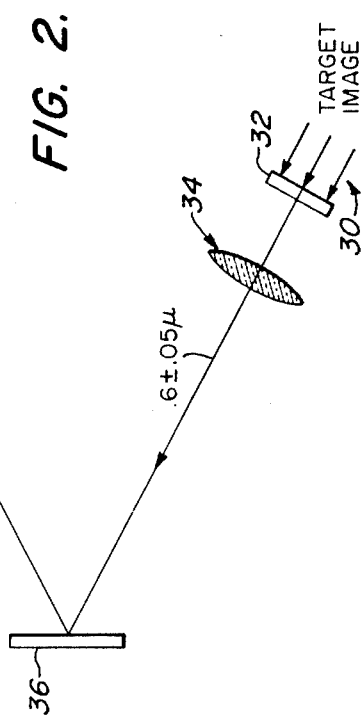

FREQUENCY CONVERSION OF NONCOHERENT RADIATION WITH A NONCOHERENT PUMP

BACKGROUND OF THE INVENTION

The present invention relates to the frequency up-conversion of an image in a nonlinear crystal, and more particularly pertains to such a system wherein the image consists of noncoherent radiation, and the pump utilized to up-convert the image also consists of radiation from a noncoherent source.

The prior art believed that at least one of the two radiation sources must be coherent to provide a minimum of phase mismatch between the two radiation beams as they travel through the nonlinear crystal. The basis of this belief was the theorized power equation which predicted less power out of a nonlinear crystal when the incident radiation from the two sources had a greater phase mismatch. This theorized power equation is:

$$P_M = \frac{6.52 \, d^2_{eff} P_S P_L}{n_L n_M n_S \lambda_M^2} \cdot \frac{\sin^2(\Delta k l/2)}{\Delta k^2/4}$$

where:
 M, S, L refer to mixed, signal, and laser
 p = peak power (watts)
 n = index of refraction
 α = wavelength (cm.)
 $d_{eff}$ = effective nonlinear coefficient (esu)
 Δk = phase mismatch
 l = length of interaction within the crystal Inspection of this equation reveals that the denominator of the second term of the equation contains $\Delta k^2$, Δk being the phase mismatch which would be an extremely large term for two noncoherent sources of radiation. Therefore, the expected result for the optical mixing of two noncoherent radiation sources was a power output ($P_M$) approaching zero.

SUMMARY OF THE INVENTION

An image conversion system is provided wherein a noncoherent radiation image at a frequency $f_1$ and a noncoherent radiation pump at a frequency $f_2$ are mixed in a nonlinear crystal to provide the image information at the sum and difference frequencies of $f_1$ and $f_2$. Contrary to what was expected by the prior art, optical mixing of two noncoherent sources of radiation provides a substantial mixed power output with an improved acceptance angle and wider bandwidth of input signals. The optical mixing of two noncoherent sources of radiation may be utilized to detect either images or point sources of radiation. The use of a noncoherent radiation pump eliminates the expense of a laser which was generally required in the prior art. A noncoherent pump makes available a greater number of pump sources such as xenon lamps, carbon arc lamps, the sun, or any other available source of radiation having a proper spectral content. Also, when a broadband noncoherent source of radiation is used as the pump, the radiation directed onto the nonlinear crystal may be swept by tuning a filter interposed between the pump and the crystal, thereby sweeping the sum and difference frequencies produced by the mixing process. The use of two noncoherent sources of radiation increases the acceptance angle of the image being processed by the nonlinear crystal. Additionally, the system operates at a greater spectral efficiency since a wider bandwidth of input signals is mixed in the crystal. The interaction of a multiplicity of frequencies of the pump with a multiplicity of the image frequencies extends the effective length of interaction ( l ) which compensates for the statistical loss of power efficiency predicted by prior work. Additionally, it is suspected that an improvement in image resolution would result when an infrared image is up-converted to the visible portion of the spectrum utilizing apparatus taught by this invention.

BRIEF DESCRIPTION OF THE DRAWINGS

FIG. 1 is a diagram which is useful in explaining the advantages of mixing two noncoherent sources of radiation.

FIG. 2 illustrates a noncollinear system for mixing an image of noncoherent radiation with radiation from a noncoherent source.

FIG. 3 is an illustration of an infrared camera system for detecting an image in the far infrared region of the spectrum and recording its up-converted image in the visible region of the spectrum.

DESCRIPTION OF THE PREFERRED EMBODIMENT

When light waves pass through a dielectric, the alternating electric field associated with the light waves polarizes the dielectric. If the electric field associated with a beam of light waves is identified by the vector quantity $\bar{E}$, the polarization produced thereby in a dielectric medium is describable by the vector quantity $\bar{P}$, which is related to E by the equation $\bar{P} = K\bar{E}$, wherein K is the dielectric tensor of the medium. When K includes significant second or higher powered terms, the dielectric is said to be nonlinear. When a nonlinear dielectric is illuminated with radiation at a given frequency, the induced polarization will include components of the harmonics of the given frequency, and these harmonics will be emitted from the nonlinear dielectric. If a nonlinear dielectric is illuminated with two radiation sources at different frequencies, the induced polarization will include components of the sum and difference frequencies, and radiation at the sum and difference frequencies will be emitted from the nonlinear dielectric.

A nonlinear optical material is capable of altering the frequency of optical or infrared radiation incident upon it. Nonlinear effects are observable in gases, liquids and solids, both by reflection and transmission. This frequency-altering effect may be utilized in a detection system to transfer information from an infrared image to an image in the visible portion of the spectrum. Such a detection system would desirably have a nonlinear optical material with a large nonlinear coefficient and a wide transmission window encompassing both the infrared and visible spectrum. In addition, such factors as good optical quality, size of crystal, accuracy of specification of axes, acceptable power levels and availability have to be weighed. Some acceptable crystals appear to be potassium dihydrogen phosphate, lithium niobate, cinnabar, barium sodium niobate, proustite, tellurium, gallium, arsenide and indium arsenide.

Optical mixing is possible in a collinear mode wherein the two sources of radiation are incident upon the nonlinear material along one linear axis, or in a noncollinear fashion wherein the two sources of radiation are incident upon the nonlinear material along two different axes. Noncollinear optical mixing accepts a wider bandwidth of signals, and accepts signals over a wider field or view. Because of this, noncollinear mixing also has the advantages of improving the imaging capability and conversion efficiency of a system. Optical mixing is possible in a pulsed mode wherein one or both of the sources of radiation are pulsed, or in a continuous wave manner wherein either one or both of the sources of radiation are continuously directed onto the nonlinear medium.

FIGURE 1 illustrates the basic concept of noncollinear phase matching of radiation from two noncoherent radiation sources. Phase matching is shown in a birefringent nonlinear crystal having an optical axis Z and a second axis X. As illustrated by this diagram the index of refraction, n, is different along the optical axis Z and the axis X. The pump radiation 10 denoted by its wave vector $K_p$ propagates at an angle $\theta_p$ relative to the optical axis. The image signal 12 denoted by its wave vector $K_i$ propagates at angle $\theta_i$ relative to wave vector $K_p$, and the sum frequency output 14 designated by the wave vector $K_s$ is phase matched at angle $\theta_s$ relative to wave vector $K_p$. Prior art would say that the necessary condition for upconversion is that the two vector quantities $K_p$ and $K_i$ must give a resultant vector $K_s$ which falls on the loci of the index curve in order to have $K_s$ propagate a near singular coherent requirement. Experiment has shown this not to be true when both $K_p$ and $K_i$ are random wave vectors. They in fact do produce $K_s$.

If a coherent radiation pump were used, only one wave vector 10 would be present in the nonlinear material to mix with only one wave vector 12 to form the sum frequency output wave vector 14. An explanation of the present invention is that when radiation from two noncoherent sources are mixed in a nonlinear crystal, more wave vectors are in phase in the crystal, and more efficient mixing results. This result is directly contrary to the predictions of the prior art. The greater efficiency of mixing is thought to occur as illustrated in FIG. 1 wherein wave vector 16, which is out of phase with wave vector 10, may still mix with wave vector 18 to form wave vector 14. Likewise wave vector 20 which is out of phase with wave vector 10 may still mix with wave vector 22 to form wave vector 14. Thus, the sum frequency output wave vector $K_s$ is thought to result from the mixing of many out of phase wave vectors which are in phase relative to some third wave vector.

FIG. 2 illustrates a noncollinear system for mixing an image of noncoherent radiation with radiation from a noncoherent source. The target image 30 is filtered by filter 32 to pass radiation in the spectral region around 0.6 microns. This target image is collimated by lens system 34 and directed onto a nonlinear crystal 38, in this instance KDP, via a mirror 36. Concurrently therewith radiation from the pump 40, which in this instance is a xenon lamp, is filtered by filter 42 to pass radiation in the spectral region around 1.06 microns, and this narrow bandwidth of radiation is directed onto nonlinear crystal 38 via a second lens system 43. Radiation from the two noncoherent sources is mixed in crystal 38, and the output from the crystal yields, among other components, the image at the sum frequency which is approximately 0.4 microns. This sum frequency image is filtered through filter 44, and directed onto an image intensifier 50 via a lens system 46. As illustrated, the output of the image intensifier may be viewed directly through an eyepiece.

FIG. 3 is an illustration of an infrared camera system for detecting an image in the far infrared region of the spectrum, and recording its up-converted image in the visible region of the spectrum. A scene 60 in the far infrared portion of the spectrum is filtered by filter 62 to pass radiation in the spectral region around 9 microns. This arrow bandwidth of radiation is collimated via a lens system 64 onto a nonlinear crystal 66, which in this instance is proustite. The transmission range of proustite is fairly large and extends from 0.6 to 13 microns. Concurrently therewith, radiation from a xenon lamp 68 is filtered by filter 70 to pass radiation in the spectral region around 0.7 microns. This narrow bandwidth of radiation is focused via lens system 72 onto the nonlinear crystal 66. The output from the crystal consists of, among other components, the image at the up-converted frequency which is approximately 0.65 microns. This up-converted image is filtered through filter 74 and then focused by lens system 76 onto an image intensifier 78, the output of which is recorded by a vidicon camera 80.

As illustrated in dotted lines in FIG. 3, in a alternative embodiment filter 70 may be swept to sequentially pass a range of frequencies. Sweeping the filter 70 would result in radiation from a different spectral region of the target image being up-converted and passed through filter 74 to the system output. This embodiment would allow the sequential analysis of different spectral regions of a target image and would effectively operate as a spectroscope. The sequential passage of different spectral regions of an infrared target would make available very valuable information about that target.

It should be understood that the foregoing disclosure relates to only preferred embodiments of the invention and that numerous modification alternatives may be made therein without departing from the teachings of the invention.

What is claimed is:
1. Apparatus for converting radiation from a first frequency to a different frequency, and comprising:
   a. nonlinear means for mixing two incident frequencies of noncoherent radiation, and for producing resultant radiation having frequencies which are the sum and difference of said two incident frequencies;
   b. projection means for directing noncoherent radiation having a first frequency onto said nonlinear means;
   c. pump means for directing noncoherent pump radiation onto said nonlinear means concurrently with the radiation being directed by said projection means, whereby the radiation from said pump means and the radiation from said projection means are mixed in said nonlinear means to form resultant radiation having frequencies which are the sum and difference of the frequencies of the radiation from said projection means and the radiation from said pump means; and
   d. sensing means for sensing at least one frequency of said resultant radiation.

2. Apparatus as set forth in claim 1 wherein said sensing means includes intensifier means for intensifying the radiation out of said nonlinear means.

3. Apparatus as set forth in claim 1 wherein a filter sweep means is interposed between said pump means and said nonlinear means for sweeping the radiation frequency from said pump which is incident upon said nonlinear means, thereby sweeping said resultant frequencies out of said nonlinear means.

4. Apparatus as set forth in claim 1 wherein said projection means includes means for projecting an image of noncoherent radiation upon said nonlinear means and said sensing means senses at least one of said resultant frequencies.

5. Apparatus as set forth in claim 4 wherein said sensing means includes an image intensifier for intensifying the resultant radiation out of said nonlinear means.

6. Apparatus as set forth in claim 5 wherein a filter-sweeping means is interposed between said pump means and said nonlinear means for sweeping the radiation frequency from said pump which is incident upon said nonlinear means, thereby sweeping the resultant radiation out of said means.

7. Apparatus as set forth in claim 6 wherein said nonlinear means is a crystal.

8. A method for converting noncoherent radiation from a first frequency to a different frequency comprising the steps of:
   a. directing noncoherent radiation at a first frequency from a first source onto a nonlinear means;
   b. concurrently directing noncoherent radiation from a noncoherent pump onto said nonlinear means whereby said nonlinear means mixes said noncoherent radiation from said first source of radiation with said noncoherent radiation from said pump to form resultant radiation having frequencies which are the sum and difference of the frequencies of the radiation from said first source and the radiation from said pump; and
   c. sensing at least one frequency of said resultant radiation 9. A method as set forth in claim 8 wherein the step of directing radiation from the noncoherent pump further comprises the step of selectively sweeping the frequency of radiation directed onto said nonlinear means thereby sweeping the resultant radiation frequency outputs from said nonlinear means.

10 A method as set forth in claim 8 wherein the first source of noncoherent radiation which is directed onto the nonlinear means is an image and said nonlinear means forms resultant sum and difference frequency images, and at least one resultant image out of said nonlinear means is sensed.